United States Patent
Xue et al.

(10) Patent No.: US 10,885,673 B2
(45) Date of Patent: *Jan. 5, 2021

(54) METHOD FOR IDENTIFYING A UNIT USING A CAMERA

(71) Applicant: CapitalBio Corporation, Beijing (CN)

(72) Inventors: Yuan Xue, Beijing (CN); Guanbin Zhang, Beijing (CN); Cheng Chen, Beijing (CN); Kaijun Zhao, Beijing (CN); Jing Chen, Beijing (CN)

(73) Assignee: Capitalbio Corporation, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,126

(22) Filed: Jul. 17, 2018

(65) Prior Publication Data
US 2018/0322659 A1 Nov. 8, 2018

Related U.S. Application Data

(63) Continuation of application No. 14/866,650, filed on Sep. 25, 2015, now Pat. No. 10,049,464.

(30) Foreign Application Priority Data

Sep. 26, 2014 (CN) .......................... 2014 1 0503931

(51) Int. Cl.
*H04N 7/18* (2006.01)
*G06T 7/90* (2017.01)

(52) U.S. Cl.
CPC ...... *G06T 7/90* (2017.01); *G06T 2207/10016* (2013.01); *G06T 2207/10024* (2013.01); *G06T 2207/30072* (2013.01)

(58) Field of Classification Search
CPC ............ G06T 7/90; G06T 2207/10016; G06T 2207/10024; G06T 2207/30072
See application file for complete search history.

(56) References Cited

U.S. PATENT DOCUMENTS

| | | | |
|---|---|---|---|
| 5,501,837 A | * | 3/1996 | Sayles ..................... B01L 3/502 422/417 |
| 5,828,779 A | | 10/1998 | Maggioni |
| 6,249,601 B1 | | 6/2001 | Kim et al. |
| 6,333,993 B1 | | 12/2001 | Sakamoto |
| 6,404,916 B1 | | 6/2002 | De La Torre-Bueno |
| 9,449,252 B1 | | 9/2016 | Usikov et al. |
| 9,818,204 B2 | | 11/2017 | Xue et al. |
| 10,049,464 B2 | | 8/2018 | Xue et al. |
| 2002/0126872 A1 | | 9/2002 | Brunk et al. |
| 2004/0264741 A1 | | 12/2004 | Omatsu et al. |
| 2007/0104363 A1 | | 5/2007 | Yoshiura et al. |

(Continued)

FOREIGN PATENT DOCUMENTS

| | | |
|---|---|---|
| CN | 101141633 | 3/2008 |
| CN | 101599122 | 12/2009 |

(Continued)

OTHER PUBLICATIONS

First Examination Report for CN 201410502643.6, dated Feb. 3, 2017, 9 pages (Including English Translation).

(Continued)

*Primary Examiner* — Peet Dhillon
(74) *Attorney, Agent, or Firm* — Rimon, P.C.

(57) ABSTRACT

In some aspects, the present disclosure relates to a method for identifying the type of the unit by camera.

6 Claims, 5 Drawing Sheets

(56) References Cited

U.S. PATENT DOCUMENTS

| | | | |
|---|---|---|---|
| 2007/0267570 | A1 | 11/2007 | Park et al. |
| 2010/0073502 | A1 | 3/2010 | An et al. |
| 2010/0208061 | A1* | 8/2010 | Lee .................... G01N 21/6456 348/135 |
| 2011/0038535 | A1 | 2/2011 | Wang et al. |
| 2011/0235855 | A1 | 9/2011 | Smith |
| 2012/0305394 | A1* | 12/2012 | Bae .................. G01N 33/48771 204/403.01 |
| 2014/0071131 | A1 | 3/2014 | Kitago |
| 2014/0192359 | A1* | 7/2014 | Martini .................... G01J 3/28 356/417 |
| 2015/0036924 | A1 | 2/2015 | Kuusisto |
| 2015/0138334 | A1 | 5/2015 | Usuba et al. |
| 2015/0138534 | A1 | 5/2015 | Tidhar |
| 2016/0092719 | A1 | 3/2016 | Xue et al. |
| 2016/0093039 | A1 | 3/2016 | Xue et al. |

FOREIGN PATENT DOCUMENTS

| | | |
|---|---|---|
| CN | 103488987 | 1/2014 |
| CN | 103839032 | 6/2014 |
| CN | 104266673 | 1/2015 |
| CN | 102799861 | 7/2015 |
| JP | S-5999581 | 6/1984 |
| JP | H-06259678 | 9/1994 |
| JP | H-11281325 | 10/1999 |
| JP | 2006/011608 | 1/2006 |
| WO | WO-2011/002524 | 1/2011 |

OTHER PUBLICATIONS

First Examination Report for CN 201410503931.3, dated Mar. 14, 2016, 6 pages (Including English Translation).

Notice of Allowance for U.S. Appl. No. 14/866,552, dated Mar. 17, 2017, 8 pages.

Notice of Allowance for U.S. Appl. No. 14/866,552, dated Jul. 10, 2017, 7 pages.

Office Action for U.S. Appl. No. 14/866,650, dated Nov. 3, 2017, 12 pages.

Response to Office Action for U.S. Appl. No. 14/866,650, dated Feb. 1, 2018, 10 pages.

* cited by examiner

METHOD FOR IDENTIFYING A UNIT USING A CAMERA

CROSS-REFERENCE TO RELATED APPLICATIONS

This application is a continuation of U.S. patent application Ser. No. 14/866,650, filed on Sep. 25, 2015, which claims priority to Chinese Patent Application No. 201410503931.3, filed on Sep. 26, 2014, published as CN 104266673 A on Jan. 7, 2015, the content of each of these priority applications is incorporated by reference herein in its entirety for all purposes.

TECHNICAL FIELD

In some aspects, the present disclosure relates to devices and methods for identification and/or detection of a unit, such as a reaction unit on a chip or array. In particular aspects, the present disclosure relates to devices and methods for identifying the type of the units using a camera.

BACKGROUND

In recent years, with the development of economy and society, more and more detections are required. Developments in material science, manufacturing technology, and microelectronics have spurred the advancement and widespread use of chip technology. Detection methods using chips, in particular, biochips, can greatly reduce the cost of medical testing and have extra advantages such as high-throughput, easy-integration. Typically, how to determine the type of detection units fast and accurately is required and necessary. The type of detection units can include the kind of analytes being analyzed in the units.

The traditional method for reading assay-information includes instrument reading, manual identification and barcode reading. However, instrument reading costs too much because of expensive equipment. Manual identification can be a waste of time and the cost of human labor is high. The printing of barcodes is complex and manufacturing the barcoded devices requires accuracy. In addition, reading a barcode requires detection of the boundaries and width of the barcode, and therefore requires high accuracy. In traditional methods, untested units should be detected one by one in proper order when there are severe different units on a chip, and requires moving the chip relative to a detector. The actual distance of the chip movement can be greater or less than designed; once the chip is moved by the wrong or inaccurate distance relative to the detector, the order of units can be changed. For example, one or more units can be skipped, which will cause incorrect identification of subsequent units. As a result, the results can be seriously deviated. Moreover, there is need for non-sequential detection, and the currently available technologies do not serve the need well.

SUMMARY

The summary is not intended to be used to limit the scope of the claimed subject matter. Other features, details, utilities, and advantages of the claimed subject matter will be apparent from the detailed description including those aspects disclosed in the accompanying drawings and in the appended claims.

In one aspect, provided herein is a method for identifying a unit on a chip using a camera system, the method comprising: 1) moving a chip across a camera field of view of a camera system, wherein the chip comprises: a) a substrate, b) a unit on the substrate, and c) a color block having a color characteristic value (CCV) that identifies the unit, and wherein a color block movement region in the camera field of view is outside of a unit movement region in the camera field of view; 2) measuring the CCV of the color block as the chip moves across the camera field of view, wherein the camera measures the real-time mean CCV of an area within the color block movement region to generate an oscillogram of the real-time mean CCV plotted against time, wherein the peak or valley value of the oscillogram is considered the CCV of the color block; and 3) using the CCV of the color block to identify the unit on the chip. In one embodiment, the method further comprises detecting the unit as the chip moves across the camera field of view. In another embodiment, the mean CCV is the average of CCVs of all the pixels of an image captured by the camera in the same color mode. In some embodiments, the color mode is selected from the group consisting of RGB, HSB, CMYK, Grayscale, Lab, and any combination thereof.

In one embodiment, the mean CCV of the substrate is set as a threshold CCV. In one embodiment, the mean CCV is the average of CCVs of all the pixels of an image captured by the camera in the same color mode. In some embodiments, the color mode is selected from the group consisting of RGB, HSB, CMYK, Grayscale, Lab, and any combination thereof. In one embodiment, the camera system further comprises an image processing unit and/or a display unit in addition to the camera. In one embodiment, the camera measures the CCVs of pixels of the substrate. In one embodiment, the image processing unit generates the mean CCV of the substrate and transmits the threshold CCV to the display unit.

In one aspect, the camera measures the real-time mean CCV of the unit movement region. In one embodiment, the mean CCV is the average of CCVs of all the pixels of an image captured by the camera in the same color mode. In some embodiments, the color mode is selected from the group consisting of RGB, HSB, CMYK, Grayscale, Lab, and any combination thereof.

In one embodiment, the camera system further comprises an image processing unit and/or a display unit in addition to the camera. In one embodiment, the camera measures the real-time CCVs of pixels of the unit movement region. In another embodiment, the image processing unit generates the real-time mean CCV of the unit movement region and transmits the real-time mean CCV to the display unit.

In one aspect, the real-time mean CCV of the unit movement region being greater or smaller than the threshold CCV indicates that the unit has entered and has not completely left the camera field of view. In another aspect, the real-time mean CCV of the unit movement region being equal to the threshold CCV indicates that the unit has not entered or has already completely left the camera field of view. In another aspect, the real-time mean CCV of the unit movement region is plotted against time to generate a waveform. In one embodiment, the appearance and disappearance of the waveform as the chip moves across the camera field of view indicate detection of the unit. In one aspect, the waveform has a peak or valley value. In another aspect, the generation of the waveform comprises wave filtering to filter out the threshold CCV.

In another aspect, the camera system further comprises an image processing unit and/or a display unit in addition to the camera. In one embodiment, the method further comprises initializing the camera and/or the image processing unit before moving the chip across the camera field of view. In one aspect, the camera measures the real-time CCVs of pixels of the area within the color block movement region. In another aspect, the image processing unit generates the real-time mean CCV of the area and transmits the real-time mean CCV to the display unit.

In one aspect, the color block movement region and the unit movement region do not overlap. In one embodiment, the area for which the oscillogram is generated is within the color block movement region and outside of the unit movement region.

In one aspect, the color block is larger than the area for which the oscillogram is generated. In one embodiment, the color block can completely cover the area for which the oscillogram is generated.

In one aspect, the unit is a reaction unit, and the CCV of the color block identifies the type of reaction in the reaction unit. In another aspect, the CCV of the color block is a mean CCV of the color block. In yet another aspect, the peak or valley value of the oscillogram indicates or is identified as the mean CCV of the color block.

In one aspect, the color block is of a single color, multiple colors, or a color pattern. In one aspect, the color block is above and/or below the unit on the chip. In one embodiment, the color block comprises a plurality of color blocks. In another embodiment, the chip comprises a first color block above the unit and a second color block below the unit. In some embodiments, the first color block and/or the second color block comprises one or more color blocks of the same or substantially the same color or different colors. In other embodiments, the first and second color blocks are of the same or substantially the same color or different colors. In one aspect, the first color block is of a single color, multiple colors, or a color combination or pattern, and/or the second color block is of a single color, multiple colors, or a color combination or pattern. In another aspect, the multiple colors of the first color block and the multiple colors of the second color block are the same, substantially the same, or different. In yet another aspect, the color combination or pattern of the first color block and the color combination or pattern of the second color block are the same, substantially the same, or different.

In one aspect, the chip comprises a plurality of units, and units of the same type are identified by color blocks having the same or substantially the same CCV. In some aspects, two CCVs are substantially the same when the CCVs are less than about 50%, less than about 40%, less than about 30%, less than about 20%, less than about 15%, less than about 10%, less than about 5%, less than about 2%, less than about 1%, less than about 0.5%, less than about 0.1%, or less than about 0.01% different from each other in value. In another aspect, the unit comprises a plurality of units. In some embodiments, units of the same type are identified by color blocks of the same or substantially the same color, or by color blocks of the same or substantially the same color combination or pattern.

In some embodiments, the plurality of units are reaction units. In one aspect, units of the same type of reaction are identified by color blocks of the same or substantially the same color, or by color blocks of the same or substantially the same color combination or pattern.

In some embodiments, the reaction involves an analyte selected from the group consisting of an amino acid, a peptide, a protein, a nucleoside, a nucleotide, an oligonucleotide, a nucleic acid, a vitamin, a monosaccharide, an oligosaccharide, a carbohydrate, a fatty acid, a lipid, an ion, an organic or inorganic compound, a drug, a pro-drug, a drug metabolite, a subcellular analyte, an organelle, a cell, a multicellular organism, a microorganism, a virus, a prion, a bacterium, a fungus, and a multicomponent complex containing any of the above.

In one aspect, the reaction is used for detecting and/or measuring the level of the analyte in a sample. In one embodiment, the sample is a biological sample.

In one aspect, the chip is moved in a straight line across the camera field of view. In another aspect, the chip is rotated such that it crosses the camera field of view.

DETAILED DESCRIPTION

Figure 1:
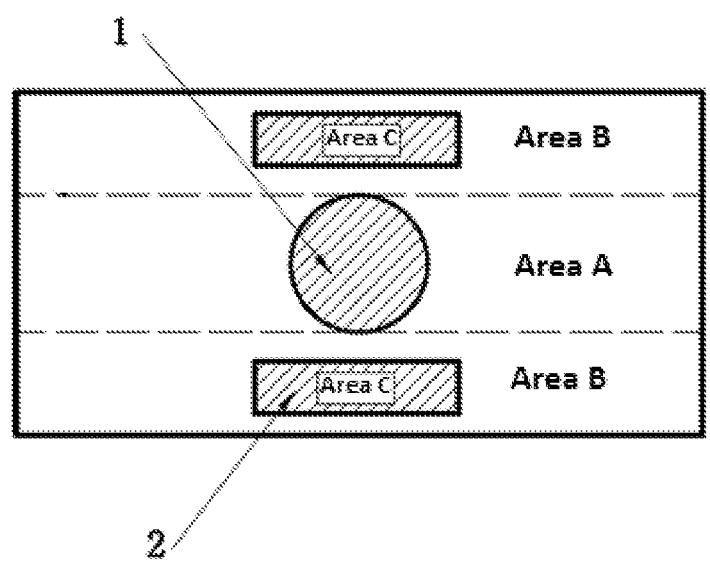
FIG. 1 is the map of a detection area, according to one aspect of the present disclosure.

A detailed description of one or more embodiments of the claimed subject matter is provided below along with accompanying figures that illustrate the principles of the claimed subject matter. The claimed subject matter is described in connection with such embodiments, but is not limited to any particular embodiment. It is to be understood that the claimed subject matter may be embodied in various forms, and encompasses numerous alternatives, modifications and equivalents. Therefore, specific details disclosed herein are not to be interpreted as limiting, but rather as a basis for the claims and as a representative basis for teaching one skilled in the art to employ the claimed subject matter in virtually any appropriately detailed system, structure, or manner. Numerous specific details are set forth in the following description in order to provide a thorough understanding of the present disclosure. These details are provided for the purpose of example and the claimed subject matter may be practiced according to the claims without some or all of these specific details. It is to be understood that other embodiments can be used and structural changes can be made without departing from the scope of the claimed subject matter. It should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. For the purpose of clarity, technical material that is known in the technical fields related to the claimed subject matter has not been described in detail so that the claimed subject matter is not unnecessarily obscured.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art.

All publications, including patent documents, scientific articles and databases, referred to in this application are incorporated by reference in their entireties for all purposes to the same extent as if each individual publication were individually incorporated by reference. If a definition set forth herein is contrary to or otherwise inconsistent with a definition set forth in the patents, patent applications, published applications or other publications that are herein incorporated by reference, the definition set forth herein prevails over the definition that is incorporated herein by reference. Citation of the publications or documents is not intended as an admission that any of them is pertinent prior art, nor does it constitute any admission as to the contents or date of these publications or documents.

All headings are for the convenience of the reader and should not be used to limit the meaning of the text that follows the heading, unless so specified.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6.

As used herein, the singular forms "a", "an", and "the" include plural references unless indicated otherwise. For example, "an" object includes one or more objects.

It is understood that aspects and embodiments of the disclosure described herein include "consisting" and/or "consisting essentially of" aspects and embodiments.

Other objects, advantages and features of the present disclosure will become apparent from the following specification taken in conjunction with the accompanying drawings.

In one aspect, the present disclosure provides a method for detecting reaction units by camera and identifying which kind of units it is by camera.

In one aspect, the present disclosure provides the following technical scheme.

1) Initiating detection by starting a camera system comprising a camera, an image processing unit, and a display unit at the beginning of testing. In some embodiments, the camera and the image processing unit are initialized at the beginning of testing.

2) Dividing the detection area of the camera into two parts: a reaction-unit region (unit movement region) and a region outside of the unit movement region. The camera captures the color pixels in an area outside the unit movement region.

3) Setting up one or more color blocks in the chip, for example, in the region outside of the unit movement region. The color blocks can be of different colors, and can be set up around the reaction unit. In some aspects, the area of the color block(s) is larger than the area in which the camera captures color pixels. The color characteristic value of the color blocks can correspond to the kinds of untested reaction units.

4) The camera capturing the color pixels of the chip substrate. The image processing unit extracts color characteristic value from each pixel and calculates the mean color characteristic value of the substrate, as the background color characteristic value. In one aspect, the mean color characteristic value of the background is set as the threshold value by the image processing unit and is sent to the display unit.

5) Moving the untested chip to the detection area of the camera. The moving can be done slowly and gradually, at a suitable speed for the camera to capture pixels of the color block and/or the unit. In some embodiments, the camera captures the color pixels of various regions (e.g., the unit movement region, the color block, or an area outside of the unit movement region, which area, for at least a period after the color block enters the area and before it leaves the area, is completely or partially covered by the color block) within the camera field of view and sends it to the image processing unit. The image processing unit extracts the mean color characteristic value from the color pixels of the regions and sends it to the display unit.

In one aspect, the image processing unit extracts the mean color characteristic value from the unit movement region in the camera detection area. The camera captures the color pixels of the chip substrate and extracts color characteristic value from each pixel of chip substrate and calculates the mean color characteristic value of the chip substrate. The mean color characteristic value of the chip substrate is set as the threshold value. If the real-time mean color characteristic value of the unit movement region is greater or less than the threshold, then the reaction unit to be detected has entered into the camera field of view. The real-time mean color characteristic values during this time (when the unit starts to enter the camera field of view and has not completely left the camera field of view) can be processed by wave filtering, for example, by extracting the background color characteristic value. After processing, the real-time mean color characteristic values (CCVs) can be plotted against time to form an oscillogram of the real-time mean CCV. The oscillogram can have a peak value, when, for example, the unit overall has a color characteristic value greater than that of the background. The oscillogram can have a valley value, when, for example, the unit overall has a color characteristic value smaller than that of the background. If the oscillogram shows the appearance of a waveform and the disappearance of the waveform, it can be considered that an untested reaction unit has been detected.

In another aspect, the camera detects color characteristic values from an area outside of the unit movement region. As the chip is moved, the color block on the chip starts to overlap with the area outside of the unit movement region, and then starts to leave the area. In one aspect, for at least a period after the color block enters the area and before it leaves the area, the area can be completely covered by the color block (if the area of the color block is larger than the area of detection). The camera detects the real-time mean color characteristic values of the detection area. When the real-time mean CCVs are plotted against time, a waveform can be generated. If the CCV of the color block is greater than the background CCV, the waveform has a peak value of the real-time mean CCVs. If the CCV of the color block is less than the background CCV, the waveform has a valley value of the real-time mean CCVs. The peak or valley value can be extracted by the color processing unit and transmitted to the display unit. The peak or valley unit can indicate or be considered the CCV of the color block, which corresponds to the identity of the unit, for example, the kind of chemical or biological reaction occurring or to be performed in the unit.

In one aspect, the position of the color block is set at the top or bottom of the reaction unit.

In another aspect, the color block can be of a single color, multiple colors, or a color combination or pattern.

In yet another aspect, there are more than one reaction units on the chip. The reaction units can be of the same kind, or of different kinds. For example, there can be one or more reaction units for detecting blood sugar levels (such as glucose levels) in samples, one or more reactions units for detecting lactic acid levels in samples, and/or one or more reaction units for detecting cholesterol levels in samples. The samples in the reaction units can be from the same subject (for example, a patient or a normal individual) or different subjects. The blood glucose reaction units can be identified by red, the lactic acid reaction units can be identified by yellow, and the cholesterol reaction units can be identified by blue. The different types of reaction units can also be identified by color blocks of different CCVs. The same kind of reaction units can be identified by the same color block or the same color block combination.

In some embodiments, the area in which the camera extracts the mean real-time CCV of the color block is separated from the unit movement region where the camera extracts the mean real-time CCV indicting the detection of a reaction unit entering the camera field of view. In one aspect, the area and the unit movement region do not overlap.

The mean color characteristic value can be the average of all the pixels in the same channel of the color mode from the image detected by the camera. The channel of the color mode includes RGB, HSB, CMYK, Grayscale and Lab, or a combination of the above color modes.

The present disclosure has following advantages by using a method disclosed herein.

1. The present disclosure uses different kinds of color block to define different reaction units and each color means a code or a kind of reaction unit. The method above can detect reaction unit precisely and in a selective way.

2. The camera captures the color pixel of the detection area. The image processing unit extracts color characteristic value from each pixel value of the detection area and calculates the mean color characteristic value of the detection area. After filtering, the value of the peak or valley of the curve (mean real-time CCVs plotted against time) can be obtained. Whether the untested reaction unit is in the detection area can also be determined.

3. The present disclosure provides a method that the kind of reaction unit can be detected by analyzing the oscillogram and counting the number of reaction units having crossed the detection area. These advantages simplify the structure and requirement of camera detection instrument, particularly those camera systems used for detection based on chip technology.

In one aspect, a camera captures the color pixels of a color block located in the region outside of the unit movement region, as the chip is moved across the field of view of the camera. The camera system detects and calculates the mean real-time color characteristic value of the detection area. After filtering, the peak or valley value of the mean real-time color characteristic values can be obtained. Whether the untested reaction unit is in the detection area can also be determined. Meanwhile, the camera captures the color characteristic value of the color block that identifies the reaction unit.

In one aspect, disclosed herein is a method for identifying the type of the reaction unit(s) on a chip by a camera. In some embodiments, the method comprises the following steps:

1) Starting the camera system, and initializing the camera and the image processing unit at the beginning of testing;

2) Dividing the detection area of the camera into two parts, shown as Area A and Area B separated by two broken lines in FIG. 1. Area A is the unit movement region as the chip moves into the camera field of view along a straight line. Area B (one part above Area A and the other below Area A) is outside the unit movement region. Within Area B, Area C denotes an area in which the camera system detects the mean real-time CCV, as the chip moves across the camera field of view. The trajectory of the chip (and the reaction unit 1 on the chip) can be a straight line as shown in FIG. 1. Alternatively, the trajectory of the reaction unit 1 can be a circle as shown in FIG. 2, in which the chip can be in the form of a disk that rotates.

Figure 2:
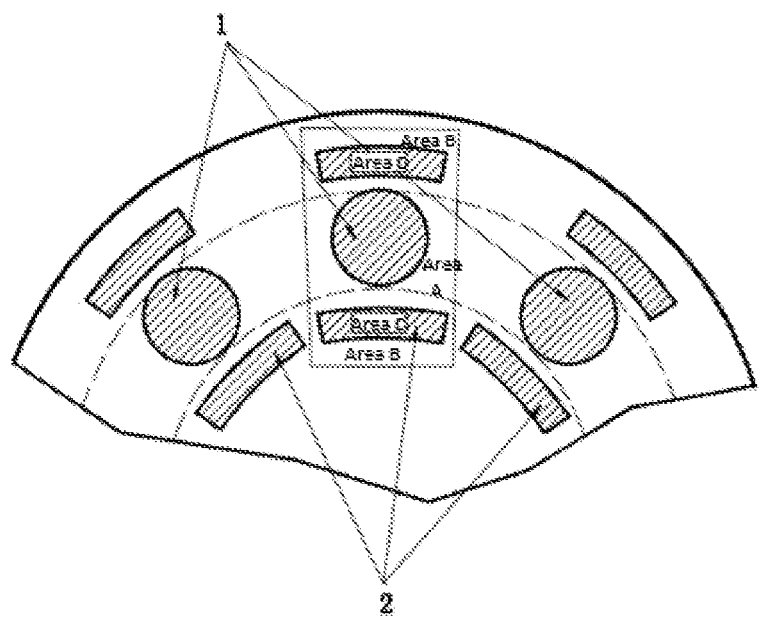
FIG. 2 is the map of a detection area when the reaction unit is in a circular motion, according to one aspect of the present disclosure.

3) As shown in FIG. 1 and FIG. 2, the chip can comprise color blocks, and the color blocks can be set on the chip before it is moved across the camera field of view. In both figures, a color block 2 is set above reaction unit 1 and a second color block 2 is set below reaction unit 1. The color characteristic value of color block 2 corresponds to the kind of the reaction unit and therefore can be used to identify the reaction unit, for example, the kind of biological or chemical reaction occurring in the reaction unit. Color block 2 can be of a single color or multiple colors or a color combination or pattern. The kinds of reactions in the reaction units can be same or different, and the same kinds of reaction units can be identified by the same color block or color combination or pattern.

4) The camera captures the color pixel of chip substrate. The image processing unit extracts color characteristic value from each pixel value of the background and calculates the mean color characteristic value of the background. The mean color characteristic value of the background is set as the threshold value and is sent to the display unit.

5) As shown in FIG. 1 and FIG. 2, the untested chip is moved to the detection area of the camera slowly and gradually. In one aspect, the chip is moved or rotated at a steady speed. In one aspect, the camera captures the color pixel of the detection area and sends it to the image processing unit. The image processing unit extracts the mean color characteristic value from the color pixel of the detection area and sends it to the display unit.

In one aspect, the camera system extracts the mean color characteristic value from Area A (the unit movement region), which corresponds to the trajectory of the reaction unit as it is moved across the camera field of view (the camera detection area). In another aspect, the camera captures the color pixels of the chip substrate and extracts color characteristic value from each pixel. The image processing unit then calculates the mean color characteristic value of the chip substrate, which is set as the threshold value (shown as a horizontal dashed line in FIG. 3). If the real-time mean color characteristic value of Area A is greater or less than the threshold, then reaction unit 1 to be detected has entered into and has not completely left the camera field of view. The real-time mean color characteristic values during this time can be processed by wave filtering, for example, by extracting the background color characteristic value. After processing, the real-time mean color characteristic values (CCVs) can be plotted against time to form an oscillogram of the real-time mean CCV, shown as the dashed waveform in FIG. 3. The appearance and disappearance of the waveform indicate that a reaction unit 1 has been detected.

In another aspect, the camera system extracts the mean color characteristic value of Area C within the color block. As the chip is moved, the color block on the chip starts to overlap with Area C in the camera field of view, and then starts to leave Area C. In one aspect, for at least a period after the color block enters Area C and before it leaves Area C, Area C can be completely covered by the color block (if the area of the color block is larger than Area C). The camera detects the real-time mean color characteristic values of Area C. When the real-time mean CCVs are plotted against time, a waveform can be generated, shown as the solid waveform in FIG. 3. If the CCV of the color block is greater than the background CCV, the waveform has a peak value of the real-time mean CCVs. If the CCV of the color block is less than the background CCV, the waveform has a valley value of the real-time mean CCVs. The peak or valley value can be extracted by the color processing unit and transmitted to the display unit. The peak or valley unit can indicate or be considered the CCV of the color block, which corresponds to the identity of the unit, for example, the kind of chemical or biological reaction occurring or to be performed in the unit. Color block 2 can be anywhere in Area B, which is outside of Area A, to avoid interferences between color block 2 and the unit movement region (Area A).

Figure 3:
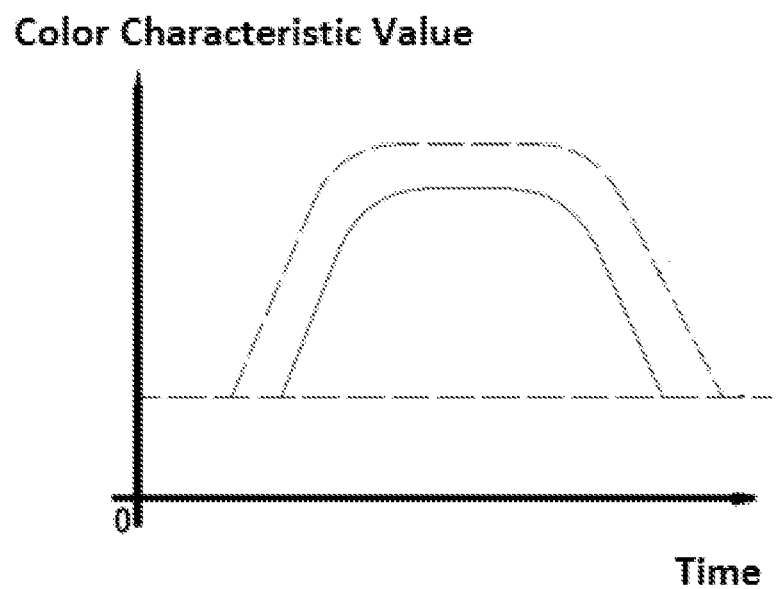
FIG. 3 is a schematic showing the mean color characteristic value plotted against time, as the chip moved across the detection area of the camera, according to one aspect of the present disclosure.

In one aspect, when the chip enters the camera field of view, if color block 2 is above or below the reaction unit in the vertical direction, the peak/valley value of the mean real-time CCVs of Area C and the peak/valley value of the mean real-time CCVs of Area A will appear at the same time. In FIG. 3, the appearance and disappearance of the dashed waveform and the solid waveform are synchronized. In other words, the dashed waveform (the mean real-time CCVs of Area A) and the solid waveform (the mean real-time CCVs of Area C) can plateau at the same time. In cases where color block 2 is not vertically above or below the reaction unit, the dashed waveform and the solid waveform will not be synchronized, and there will be a phase difference. However, the peak/valley value can still be calculated.

In one aspect, disclosed herein is a method for identifying a unit on a chip using a camera system. In one embodiment, the method comprises moving a chip across a camera field of view of a camera system. In any of the preceding embodiments, the chip can comprise: a) a substrate, b) a unit on the substrate, and/or c) a color block having a color characteristic value (CCV) that identifies the unit. In any of the preceding embodiments, a color block movement region in the camera field of view can be outside of a unit movement region in the camera field of view.

In any of the preceding embodiments, the method can further comprise measuring the CCV of the color block as the chip moves across the camera field of view. In any of the preceding embodiments, the camera can measure the real-time mean CCV of an area within the color block movement region to generate an oscillogram of the real-time mean CCV plotted against time. In any of the preceding embodiments, the peak or valley value of the oscillogram can indicate or be considered the CCV of the color block.

In any of the preceding embodiments, the method can further comprise using the CCV of the color block to identify the unit on the chip.

In any of the preceding embodiments, the mean CCV of the substrate can be set as a threshold CCV.

In any of the preceding embodiments, the method can further comprise detecting the unit as the chip moves across the camera field of view. In any of the preceding embodiments, the camera can measure the real-time mean CCV of the unit movement region. In any of the preceding embodiments, the real-time mean CCV of the unit movement region being greater or smaller than the threshold CCV can indicate that the unit has entered and has not completely left the camera field of view. In any of the preceding embodiments, the real-time mean CCV of the unit movement region being equal to the threshold CCV can indicate that the unit has not entered or has already completely left the camera field of view.

In any of the preceding embodiments, the real-time mean CCV of the unit movement region can be plotted against time to generate a waveform. In any of the preceding embodiments, the appearance and disappearance of the waveform as the chip moves across the camera field of view can indicate detection of the unit.

In any of the preceding embodiments, the waveform can have a peak or valley value. In any of the preceding embodiments, the generation of the waveform can comprise wave filtering to filter out the threshold CCV.

In any of the preceding embodiments, the camera system can further comprise an image processing unit and/or a display unit in addition to the camera. In any of the preceding embodiments, the method can further comprise initializing the camera and/or the image processing unit before moving the chip across the camera field of view.

In some embodiments, the color block movement region and the unit movement region do not overlap. In any of the preceding embodiments, the area for which the oscillogram is generated can be within the color block movement region and outside of the unit movement region.

In any of the preceding embodiments, the color block can be larger than the area for which the oscillogram is generated. In any of the preceding embodiments, the color block can completely cover the area for which the oscillogram is generated.

In any of the preceding embodiments, the camera can measure the real-time CCVs of pixels of the area within the color block movement region. In any of the preceding embodiments, the image processing unit can generate the real-time mean CCV of the area and transmit the real-time mean CCV to the display unit.

In any of the preceding embodiments, the camera system can further comprise an image processing unit and/or a display unit in addition to the camera. In any of the preceding embodiments, the camera can measure the CCVs of pixels of the substrate. In any of the preceding embodiments, the image processing unit can generate the mean CCV of the substrate and transmit the threshold CCV to the display unit.

In any of the preceding embodiments, the camera system can further comprise an image processing unit and/or a display unit in addition to the camera. In any of the preceding embodiments, the camera can measure the real-time CCVs of pixels of the unit movement region. In any of the preceding embodiments, the image processing unit can generate the real-time mean CCV of the unit movement region and transmit the real-time mean CCV to the display unit.

In any of the preceding embodiments, the unit can be a reaction unit. In any of the preceding embodiments, the CCV of the color block can be used to identify the type of reaction in the reaction unit.

In any of the preceding embodiments, the CCV of the color block can be a mean CCV of the color block. In any of the preceding embodiments, the peak or valley value of the oscillogram can indicate the mean CCV of the color block.

In any of the preceding embodiments, the color block can be of a single color, multiple colors, or a color pattern.

In any of the preceding embodiments, the color block can be above and/or below the unit on the chip.

In any of the preceding embodiments, the color block can comprise a plurality of color blocks.

In any of the preceding embodiments, the chip can comprise a first color block above the unit and a second color block below the unit. In any of the preceding embodiments, the first color block and/or the second color block can comprise one or more color blocks of the same or substantially the same color or different colors.

In any of the preceding embodiments, the first and second color blocks can be of the same or substantially the same color or different colors In any of the preceding embodiments, the first color block can be of a single color, multiple colors, or a color combination or pattern. In any of the preceding embodiments, the second color block can be of a single color, multiple colors, or a color combination or pattern.

In any of the preceding embodiments, the multiple colors of the first color block and the multiple colors of the second color block can be the same, substantially the same, or different.

In any of the preceding embodiments, the color combination or pattern of the first color block and the color combination or pattern of the second color block can be the same, substantially the same, or different.

In any of the preceding embodiments, the chip can comprise a plurality of units. In any of the preceding embodiments, units of the same type can be identified by color blocks having the same or substantially the same CCV.

In any of the preceding embodiments, the unit can comprise a plurality of units, and units of the same type can be identified by color blocks of the same or substantially the same color, or by color blocks of the same or substantially the same color combination or pattern.

In any of the preceding embodiments, the plurality of units can be reaction units. In any of the preceding embodiments, units of the same type of reaction can be identified by color blocks of the same or substantially the same color, or by color blocks of the same or substantially the same color combination or pattern.

In any of the preceding embodiments, the reaction can involve an analyte selected from the group consisting of an amino acid, a peptide, a protein, a nucleoside, a nucleotide, an oligonucleotide, a nucleic acid, a vitamin, a monosaccharide, an oligosaccharide, a carbohydrate, a fatty acid, a lipid, an ion, an organic or inorganic compound, a drug, a pro-drug, a drug metabolite, a subcellular analyte, an organelle, a cell, a multicellular organism, a microorganism, a virus, a prion, a bacterium, a fungus, and a multicomponent complex containing any of the above.

In any of the preceding embodiments, the reaction can be used for detecting and/or measuring the level of the analyte in a sample. In any of the preceding embodiments, the sample can be a biological sample.

In any of the preceding embodiments, the mean CCV can be the average of CCVs of all the pixels of an image captured by the camera in the same color mode. In any of the preceding embodiments, the color mode can be selected from the group consisting of RGB, HSB, CMYK, Grayscale, Lab, and any combination thereof.

In any of the preceding embodiments, the chip can be moved in a straight line across the camera field of view. In any of the preceding embodiments, the chip can be rotated such that it crosses the camera field of view.

In one aspect, disclosed herein is a chip comprising: a) a substrate, b) a unit on the substrate, and c) a color block having a color characteristic value (CCV) that identifies the unit. In any of the preceding embodiments, the chip can be of a suitable shape, for example, the chip may be thin in one dimension and may have various shapes in other dimensions, for example, a rectangle, a circle, an ellipse, or other irregular shapes.

In any of the preceding embodiments, the unit can be a reaction unit in which one or more chemical or biological reactions can occur. In any of the preceding embodiments, the chip can comprise a plurality of units on the substrate and a plurality of color blocks, each of the color blocks identifying one of the plurality of units. In any of the preceding embodiments, units for substantially the same type of reaction can be identified by color blocks of substantially the same CCV. In any of the preceding embodiments, the unit and the color block can be arranged such that when the chip is moved in a direction, the trajectory of the unit and the trajectory of the color block do not completely overlap. In any of the preceding embodiments, the unit and the color block can be arranged such that when the chip is moved in a direction, the trajectory of the unit and the trajectory of the color block do not overlap at all.

In one aspect, disclosed herein is a device comprising the chip of any of the preceding embodiments and a camera system. In any of the preceding embodiments, the camera system can comprise a camera, an image processing unit, and/or a display unit.

The following examples are offered to illustrate but not to limit the disclosure.

Example 1

Figure 4:
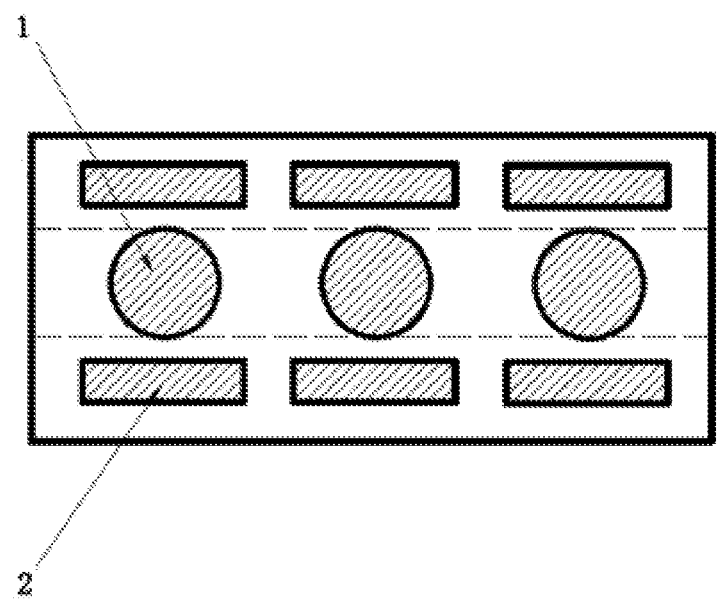
FIG. 4 is the map of a chip containing several reaction units.
Figure 5:
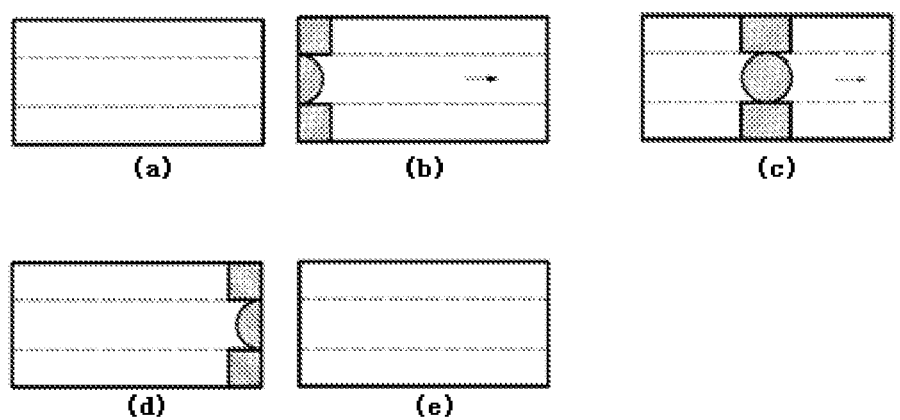
FIG. 5 is a schematic showing a reaction unit on chip as the chip moved across the detection area of a camera. (a) The reaction unit is not in the detection area. (b) The reaction unit starts to enter the detection area of the camera. (c) The reaction unit enters into the detection area and stays in the area completely. (d) The reaction unit begins to leave the detection area. (e) The reaction unit leaves the detection area completely.

In this example, a CMOS camera is used to identify the kinds of reaction units in a chip. The chip comprises several reaction units 1 which are distributed in a row on the chip (shown in FIG. 4). The reaction units are moved across the camera field of view in a straight line. Therefore, the unit movement region within the camera field of view is the same for the three reaction units shown in FIG. 4. The trajectory of the chip across the camera field of view is shown in FIGS. 5(a)-5(e).

Step 1: Starting the camera, the image processing unit and the display unit at the beginning of testing.

Step 2: The camera captures the color pixel of chip substrate in RGB (red, green, blue) channel. The image processing unit extracts color characteristic value in R channel from each pixel value of the background and calculates the mean color characteristic value of the background, which is set as the threshold value and the value is 100.

Step 3: Printing three different kinds of color above/below the reaction unit of the chip. The values in R channel of the color blocks for the three reaction units are 120, 160, and 90, respectively. The trajectories of the color block and the reaction units as they are moved with the chip do not overlap. The values of the color blocks correspond to the kinds of the reaction in the reaction unit. For example, the color characteristic value of 120 means the reaction unit is used for a reaction involving glucose, the color characteristic value of 160 means the reaction unit is used for a reaction involving lactic acid, and the color characteristic value of 90 the reaction unit is used for a reaction involving cholesterol.

Step 4: The chip enters into the camera detection area in a straight line and the image processing unit extracts the real-time mean color characteristic value of Area A (the unit moving region) and area C at the same time. Reaction unit 1 is detected by the camera as the color characteristic value of Area A reaches the peak or valley value. When the color characteristic value of Area C is 120, the kind of reaction unit is for a reaction involving glucose; when the color characteristic value of Area C is 90, the kind of reaction unit is for a reaction involving cholesterol; when the color characteristic value of Area C is 160, the kind of reaction unit is for a reaction involving lactic acid.

Example 2

In this example, a CMOS camera is used to identify the kinds of reaction units in a chip. The chip comprises several reaction units 1 which are distributed in a circle on the chip (shown in FIG. 2). The reaction units are moved across the camera field of view by rotation around the center of the circle. Therefore, the unit movement region within the camera field of view is the same for the three reaction units shown in FIG. 2.

Step 1: Starting the camera, the image processing unit and the display unit at the beginning of testing.

Step 2: The camera captures the color pixel of chip substrate in CMYK (cyan, magenta, yellow, black) channel. The image processing unit extracts color characteristic value in M channel from each pixel value of the background and calculates the mean color characteristic value of the background, which is set as the threshold value and the value is 50.

Step 3: Printing three different kinds of color above/below the reaction unit of the chip. The values in M channel of the color blocks for the three reaction units are 90, 130, and 70, respectively. The trajectories of the color block and the reaction units as they are moved with the chip do not overlap. The values of the color blocks correspond to the kinds of the reaction in the reaction unit. For example, the color characteristic value of 90 means the reaction unit is used for a reaction involving glucose, the color characteristic value of 130 means the reaction unit is used for a reaction involving lactic acid, and the color characteristic value of 70 the reaction unit is used for a reaction involving cholesterol.

Step 4: The chip enters into the camera detection area in a rotary motion (shown in FIG. 2) and the image processing unit extracts mean color characteristic value of Area A (the unit moving region) and area C at the same time. Reaction unit 1 is detected by the camera as the color characteristic value of Area A reaches the peak or valley value. When the color characteristic value of Area C is 90, the kind of reaction unit is for a reaction involving glucose; when the color characteristic value of Area C is 70, the kind of reaction unit is for a reaction involving cholesterol; when the color characteristic value of Area C is 130, the kind of reaction unit is for a reaction involving lactic acid.

The plurality of reaction units can be detected sequentially (e.g., in the order that the units are provided on a chip) or selectively (e.g., some units can be skipped). The channel of color pattern can be RGB, CMYK, HSB (hue, saturation, brightness), Lab (L represents brightness-channel, a and b represents color channel) and a combination thereof.

Additional embodiments are provided below.

Embodiment 1

A method for detecting reaction units by camera and identifying the kind of units by camera, the method comprising the following steps:

1) starting the camera, the image processing unit and the display unit at the beginning of testing;

2) dividing the detection area of camera into two parts: reaction-unit region and out-reaction-unit region, wherein the camera captures the color pixel in an area in the out-reaction-unit region;

3) setting up the different kinds of color blocks around the reaction units in the out-reaction-unit region, wherein the area of color blocks is larger than the area of the camera detection area which is outside of the reaction units moving orbit, and wherein the color characteristic value of the color blocks correspond to the kinds of untested reaction units;

4) capturing the color pixel of chip substrate using the camera, wherein the image processing unit extracts color characteristic value from each pixel value of background, calculates the mean color characteristic value of the background, which is set as the threshold value, and sends it to the display unit;

5) moving the untested chip to the detection area of camera slowly and gradually, wherein the camera captures the color pixel of detective area and sends it to the image processing unit, wherein the image processing unit extracts the mean color characteristic value from the color pixel of the detection area and sends it to the display unit, wherein:

a) the camera extracts the mean color characteristic value from moving orbit area of reaction units in the camera detection area, wherein the camera captures the color pixel of chip substrate and extracts color characteristic value from each pixel value of chip substrate and calculates the mean color characteristic value of the chip substrate, which is set as the threshold value, wherein if the real-time mean color characteristic value of detective area is greater or less than the threshold, then the reaction unit to be detected has entered into the camera detective area, wherein the data during the time period of the mean color characteristic value of detective area being greater or less than the threshold until the mean color characteristic value of detective area is equal to the threshold are processed by wave filtering and plotted in a waveform which has a peak or valley value, wherein the appearance of the waveform and subsequent disappearance of the waveform indicate a reaction unit has been detected; and (b) the camera extract the color characteristic value from the out-moving orbit area of reaction units in the camera detection area, wherein the kind of reaction units can be decided by a peak or valley value which is extracted from the color blocks.

Embodiment 2

The method of Embodiment 1, wherein the color blocks are above or below the reaction units of the chip.

Embodiment 3

The method of Embodiment 1, wherein the color block in step 3) can be of a single color, multiple colors, or a color combination or pattern.

Embodiment 4

The method of Embodiment 2, wherein the color block in step 3) can be of a single color, multiple colors, or a color combination or pattern.

Embodiment 5

The method of any one of Embodiments 1-4, wherein there are a plurality of reaction units on the chip and the same kind of reaction units are identified by the same color block or combination.

Embodiment 6

The method of any one of Embodiments 1-4, in part b) of step 5), wherein the detection area of the color block and the moving orbit area of the reaction units are separated.

Embodiment 7

The method of Embodiment 5, in part b) of step 5), wherein the detection area of the color block and the moving orbit area of the reaction units are separated.

Embodiment 8

The method of any one of Embodiments 1-4 and 7, wherein the mean color characteristic value is the average of all the pixels in the same channel of the color mode from the image detected by camera, and wherein the channel of the color mode includes RGB, HSB, CMYK, Grayscale, Lab, or a combination thereof.

Embodiment 9

The method of Embodiment 5, wherein the mean color characteristic value is the average of all the pixels in the same channel of the color mode from the image detected by camera, and wherein the channel of the color mode includes RGB, HSB, CMYK, Grayscale, Lab, or a combination thereof.

Embodiment 10

The method of Embodiment 6, wherein the mean color characteristic value is the average of all the pixels in the same channel of the color mode from the image detected by camera, and wherein the channel of the color mode includes RGB, HSB, CMYK, Grayscale, Lab, or a combination thereof.

The invention claimed is:

1. A device comprising a chip and a camera system,
wherein the camera system comprises a camera, an image processor, and a display; and
the chip comprises: a) a substrate, b) a unit on the substrate, and c) a color block having a color characteristic value (CCV) that identifies the unit, wherein the unit and the color block are arranged such that when the chip is moved in a direction, the trajectory of the unit and the trajectory of the color block do not completely overlap;
wherein the image processor is configured to extract a background CCV and the color block CCV, generate a waveform that includes the background CCV and the color block CCV, and displays the generated waveform on a display which indicates a type of reaction on the unit.

2. The device of claim 1, wherein the chip is rectangular or round.

3. The device of claim 1, wherein the unit is a reaction unit in which one or more chemical or biological reactions can occur.

4. The device of claim 1, which comprises a plurality of units on the substrate and a plurality of color blocks, each of the color blocks identifying one of the plurality of units.

5. The device of claim 4, wherein units for substantially the same type of reaction are identified by color blocks of substantially the same CCV.

6. The device of claim 1, wherein the unit and the color block are arranged such that when the chip is moved in a direction, the trajectory of the unit and the trajectory of the color block do not overlap at all.

* * * * *